United States Patent [19]

Walker et al.

[11] Patent Number: 4,689,731
[45] Date of Patent: Aug. 25, 1987

[54] MOSFET INVERTER GATE DRIVE CIRCUIT

[75] Inventors: Charles S. Walker; Jay W. Atherton; Gerald W. West, all of Seattle, Wash.

[73] Assignee: Honeywell Inc., Minneapolis, Minn.

[21] Appl. No.: 894,165

[22] Filed: Aug. 7, 1986

[51] Int. Cl.$^4$ .......................................... H02M 7/538
[52] U.S. Cl. ..................................... 363/24; 363/134
[58] Field of Search ...................... 363/24, 25, 26, 54, 363/79, 97, 133, 134, 21

[56] References Cited

U.S. PATENT DOCUMENTS

| | | | |
|---|---|---|---|
| 4,308,577 | 12/1981 | Mentler | 363/134 |
| 4,499,530 | 2/1985 | Onda et al. | 363/21 |
| 4,591,964 | 5/1986 | Kemstedt | 363/134 |

FOREIGN PATENT DOCUMENTS 0186992 11/1982 Japan ................... 363/134

*Primary Examiner*—Patrick R. Salce
*Assistant Examiner*—Judson H. Jones
*Attorney, Agent, or Firm*—Roger W. Jensen

[57] ABSTRACT

An inverter for producing A.C. from a source of D.C. electric power. The power circuit includes a power transformer with the current flow through the two halves of the primary winding 16 being controlled by a pair of power MOSFETs. A gate driver circuit which includes a driver transformer produces control signals which are substantially 180° out of phase across the center tapped secondary winding of the driver transformer. A pair of fast-off, slow-on coupling circuits consisting of a diode connected in parallel with a resistor couples gate control signals to the gates of the power MOSFETs. Each coupling circuit is effectively in series with one of a pair of current limiting off-time setting resistors, the latter being connected in series with the two halves of the primary winding of the gate driver circuit control transformer. The relationship of resistances of the resistors of the coupling circuits to the resistance of the current limiting resistors of the gate driver circuit determines the difference between the turn-off time and the turn-on times of the MOSFETs. The current limiting resistors prevent burnout of the gate driver contact transformer and the gate control transistors.

1 Claim, 6 Drawing Figures

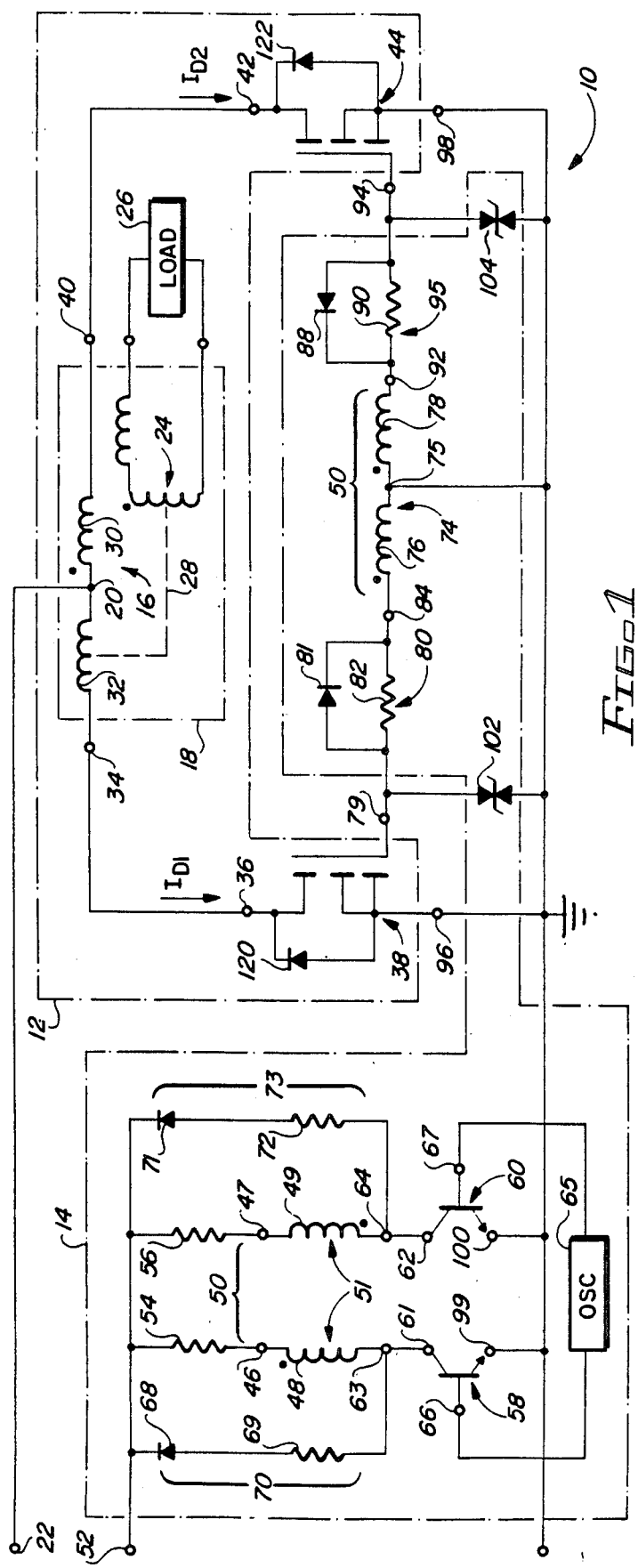
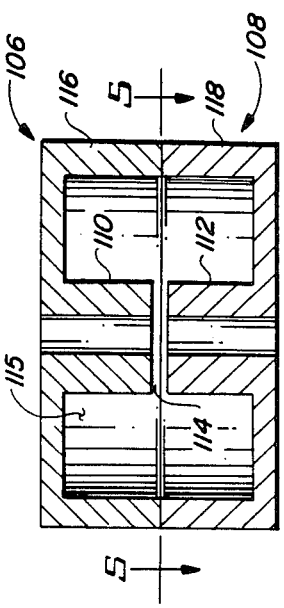
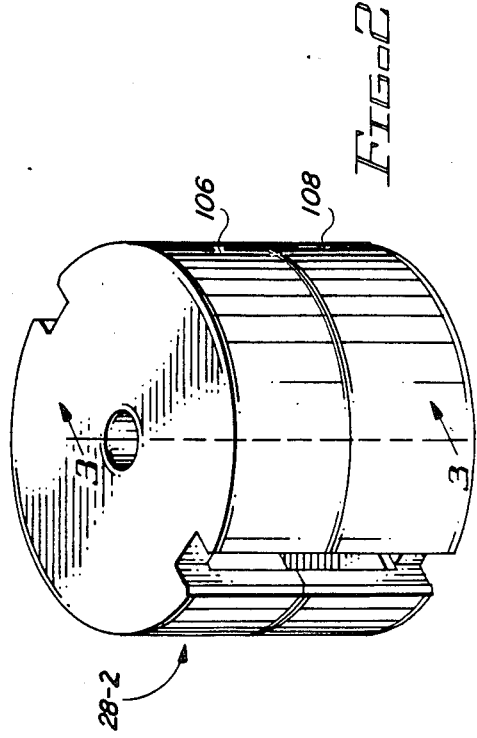

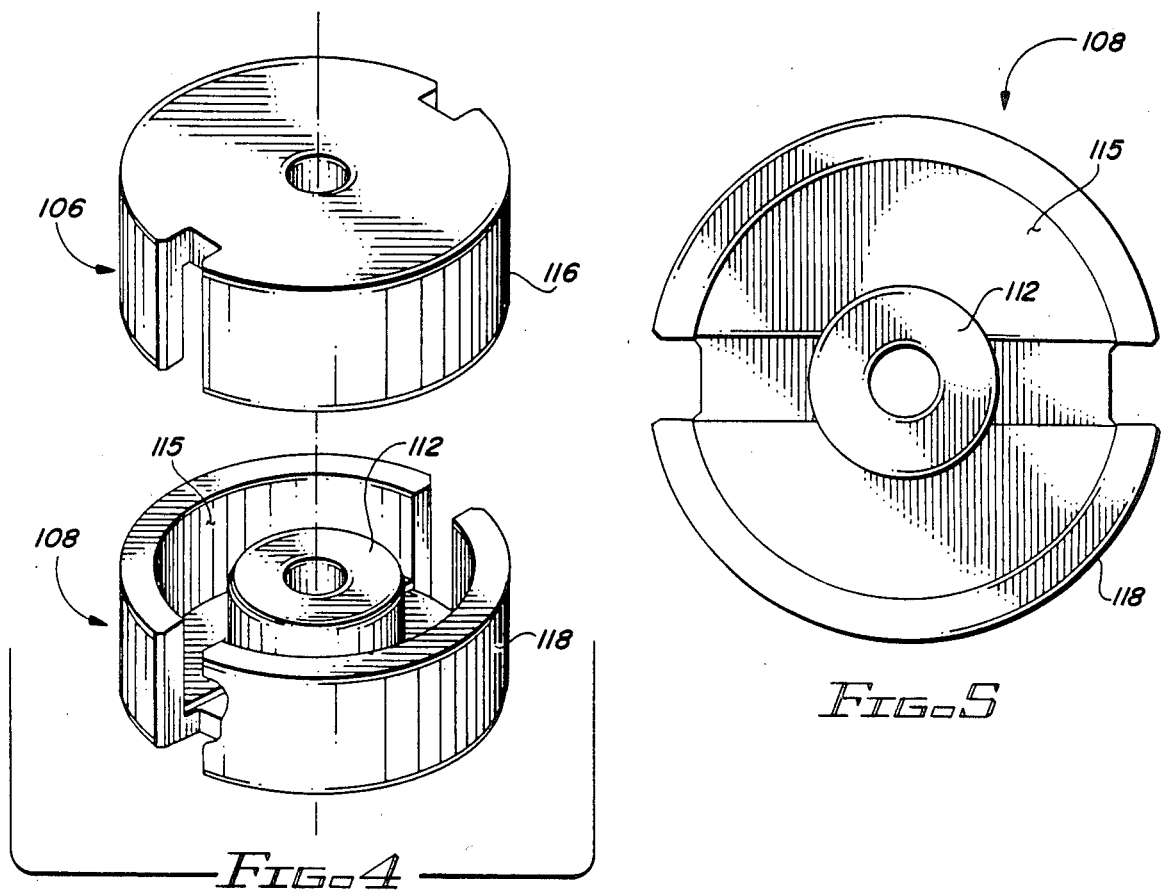
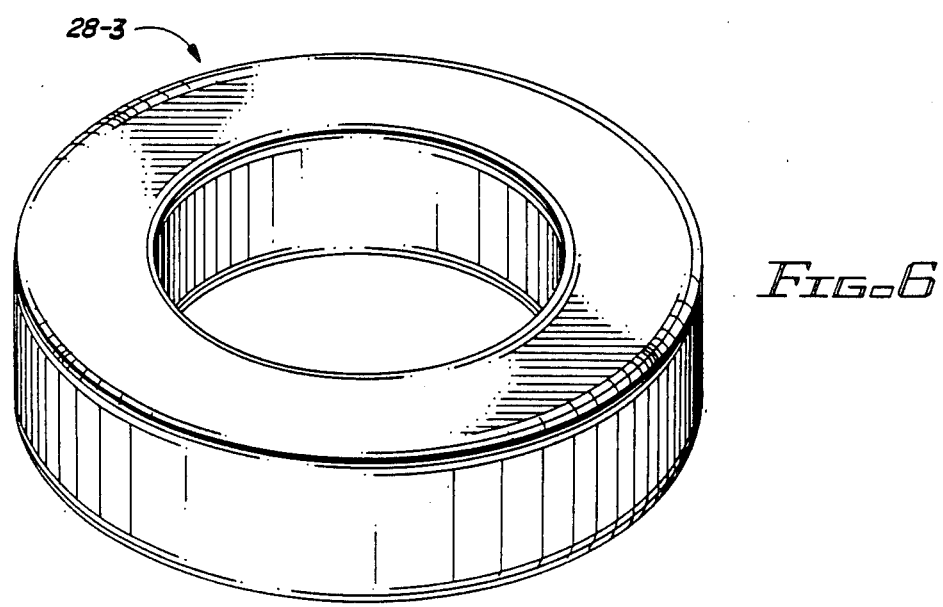

MOSFET INVERTER GATE DRIVE CIRCUIT

BACKGROUND OF THE INVENTION

1. Field of the Invention

This invention is in the field of circuits for converting direct current (D.C.) to alternating current (A.C.), and more particularly relates to an inverter having a gate drive circuit for controlling power metal oxide silicon field effect transistors (MOSFETs) of such an inverter.

2. Description of the Prior Art

There are now available MOSFETs that have the capability of handling large electric currents at high voltages. A typical characteristic of MOSFETs is that they have high gate input impedances so that MOSFETs are voltage controlled, and thus require very low gate input power. These characteristics have led to the use of power MOSFETs to control the flow of direct currents through the primary windings of the power transformers of inverters.

MOSFETs, however, have highly non-linear gate capacitance characteristics and wide gate charge tolerances. These less than desirable characteristics require that close attention be given to the design of power MOSFET gate drive circuits, otherwise destructively large currents will flow through the power MOSFETs and the primary windings of the power transformer if both power MOSFETs conduct, i.e., both are on at the same time. Destructively large currents can also result from turning the on-coming MOSFET on too soon; from not turning the on-coming MOSFET on soon enough; or from saturating the core of the power transformer for any reason.

BRIEF SUMMARY OF THE INVENTION

This invention provides an improved inverter in which a voltage from a suitable source of D.C. power is connected to the center tap of the primary winding of a power transformer. The MOSFETs alternately connect the start and finish ends of the primary winding to the power supply return. In this way an alternating voltage is formed. The gate drive circuit which turns-on and turns-off the MOSFETs includes a gate driver transformer. D.C. current from a source of D.C. power flows through two dual purpose primary resistors connected in series with the two halves of the primary winding of the gate driver transformer. Flow of current through the two halves of the primary winding of the gate driver transformer is controlled by a pair of control transistors which are alternately rendered conductive and non-conductive substantially 180° out of phase by a suitable source of substantially square wave timing signals applied to the bases of the control transistors. The ends of the center tapped secondary winding of the gate driver transformer of the gate driver circuit are connected to the gates of the power MOSFETs by coupling circuits which include a secondary diode and a secondary resistor connected in parallel. The equivalent fast-off, slow-on circuit for a power MOSFET includes a primary resistor of the gate drive circuit which is effectively in series with the coupling circuit connected to the MOSFET's gate because, in the preferrd embodiment, the gate driver transformer has a one-to-one turns ratio for each winding. A transient suppression circuit which includes a diode and a resistor connected in series is connected in parallel with each half of the primary winding of the driver, or control, transformer and its associated current limiting off-time setting primary resistor. To a first approximation, the "off" time is controlled by the resistance of the primary resistor alone. The "on" time is controlled by the sum of the resistance of a primary resistor and the resistance of a secondary resistor which are in series.

It is, therefore, an object of this invention to prevent both power MOSFETs of an inverter from being on at the same time.

It is another object of this invention to prevent turning on the on-coming power MOSFET of an inverter too quickly while minimizing the possibility of turning on the on-coming power MOSFET too slowly.

It is yet another object of this invention to prevent saturation of the core of the power transformer of an inverter which can result in the burn out of the power MOSFET transistors.

It is still another object of this invention to prevent burnout of the driver transistors, or the driver transformer, or both, of the gate drive circuit of an inverter.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic circuit diagram of the preferred embodiment of the inverter of this invention;

FIG. 2 is a perspective view of one embodiment of a core of a power transformer;

FIG. 3 is a section taken on line 3—3 of FIG. 2;

FIG. 4 is an exploded perspective view of the core illustrated in FIG. 2;

FIG. 5 is a plan view of one of the cup cores illustrated in FIG. 4, and

FIG. 6 is a perspective view of a second embodiment of the core of a power transformer.

DESCRIPTION OF THE PREFERRED EMBODIMENT

In FIG. 1, inverter 10 includes a power circuit 12 and a gate drive, or control, circuit 14. Primary winding 16 of power transformer 18 is provided with a center tap 20 which is connected to direct current (D.C.) power input terminal 22 which is connected to an appropriate source of D.C. power. Secondary winding 24 of power transformer 18 has induced in it an A.C. potential which is connected across load 26. Transformer 18 is provided with a suitable core 28 which is indicated symbolically by a dashed line. Different embodiments of core 28 are illustrated in FIGS. 2 through 6. Center tap 20 divides primary winding 16 into two portions, or two windings, 30, 32 each having an equal number of turns of conductor. Output terminal 34 of winding 32 is connected to drain terminal 36 of power MOSFET 38, and output terminal 40 of winding 30 is connected to the drain terminal 42 of power MOSFET 44.

Terminals 46, 47 of windings 48, 49 of gate driver transformer 50 which together form transformer 50's primary windings 51 are connected by current limiting off-time setting primary resistors 54, 56 to a suitable source of D.C. potential connected to gate driver circuit power input terminal 52. Flow of current through windings 48, 49 is controlled by driver, or control, transistors 58, 60. Collectors 61, 62 of transistors 58, 60 are respectively connected to terminals 63, 64 of primary windings 48, 49. Control, or timing, signals having a substantially square wave form which are substantially 180° out of phase are produced by oscillator 65 and are applied to the base terminals 66, 67 of transistors 58, 60 to alternately render them conductive. Diode 68 and resistor 69 are connected in parallel with winding 48 and resistor 54 to form a transient suppression circuit 70. Similarly, diode 71 and resistor 72 which are also connected in series also form another transient suppression circuit 73 which is connected in parallel with resistor 56 and winding 49.

The secondary winding 74 of gate driver transformer 50 is provided with a center tap 75. Center tap 75 divides winding 74 into two equal portions, or windings, 76, 78. Winding 76 is connected to gate terminal 79 of MOSFET 38 by coupling circuit 80 which includes secondary diode 81 and secondary resistor 82 which are connected in parallel between terminal 84 of secondary winding 76 and gate terminal 79 of MOSFET 38. Diode 81, secondary resistor 82 and a primary resistor 54 or 56 form part of a fast-off, slow-on circuit for MOSFET 38. Similarly, winding 78 is connected to gate terminal 94 of MOSFET 44 by coupling circuit 95 which includes secondary diode 88 and secondary resistor 90 which are also connected in parallel between terminal 92 of winding 78 and gate terminal 94 of MOSFET 44. Diode 88, secondary resistor 90 and a primary resistor 54, or 56 form part of a fast-off, slow-on circuit for MOSFET 44. Source terminal 96 of MOSFET 38, source terminal 98 of MOSFET 44, center tap 75 of secondary winding 74 and the emitter terminals 99, 100 of transistors 58, 60 are all connected to ground. Bidirectional zener diodes 102, 104 limit the maximum voltage applied to gate terminals 79, 94 of MOSFETs 38, 44.

In operation, control, or timing, signals applied by conventional timing oscillator 65 to the bases 66, 67 of transistors 58, 60, which are square waves substantially 180° out of phase in the preferred embodiment, cause current to alternately flow through windings 48, 49, the primary windings of transformer 50. The current flowing alternately through windings 48, 49 induce voltage waves in secondary windings 76, 78 of control transformer 50. In the figure of the drawing the core of transformer 50 is not illustrated since it is conventional. The voltage waves induced in secondary windings 76, 78 of transformer 50 are applied alternately to the gate terminals 79, 94 of power MOSFETs 38, 44. When terminal 84 of winding 76 goes positive, current flow to charge the gate capacitance of MOSFET 38 is through secondary resistor 82 which is in series with primary resistor 54 because of the characteristics of transformer 50. When terminal 84 subsequently goes negative, charge stored in the gate capacitance of MOSFET 38 is discharged principally through secondary diode 81 in series with primary resistor 56. The circuit including secondary diode 81 and primary resistor 56 forms a fast-off circuit while resistor 82 in series with resistor 54 forms the slow-on circuit for MOSFET 38. Since primary resistors 54 and 56 are equal in value, turning on MOSFET 38 for example, takes more time than turning it off. The function of diode 88 and resistors 54, 56 and 90 with respect to power MOSFET 44 is the same.

The control signals applied to gate terminals 79 and 94 of MOSFETs 38 and 44 render MOSFETs 38, 44 alternately conductive with the result that current flow through windings 30, 32 of power transformer 18 produce substantially square A.C. voltage waves at the output terminals of the secondary winding 24 of power transformer 18, which A.C. voltage is applied across load 26.

Gate drive circuit 14 prevents both power MOSFETs 38, 44 from being on, or conductive, at the same time because the time required by circuit 14 to turn on a MOSFET is purposely made longer than the time required to turn it off. The relationship between turn off and turn on times is determined by the relationship of the magnitude of the resistance of primary resistors 54, 56, which are equal to each other, and in the preferred embodiment each has a value of 205 ohms to the values of the resistances of secondary resistors 82, 90 which are also equal to each other, and in the preferred embodiment, each has a value of 392 ohms. The turn-off advantage can be increased by decreasing the resistance of primary resistors 54, 56, for example, or can be decreased by increasing the resistances of resistors 54, 56 relative to those of resistors 82, 90.

In the preferred embodiment, the reluctance of core 28 of power transformer 18 is made relatively high which in conjunction with gate drive circuit 14 minimizes the possibility of saturating core 28 because of MOSFET gate capacitance mismatch. To provide the desired level of reluctance, core 28-2 of power transformer 18, illustrated in FIGS. 2–5, is provided with the desired level of reluctance by an air gap. Core 28-2 includes two halves 106, 108 which are sometimes referred to as cups and core 28-2 as a cup, or pot, core. The center posts 110, 112, when cups 106, 108 are assembled, are spaced apart to form air gap 114 in the magnetic circuit of core 28-2, as is best illustrated in FIG. 3. A conventional bobbin, which is not illustrated, and on which the primary and secondary windings of power transformer 18 would be wound is placed around center posts 110, 112 in the space, or annular cavity, 115, between the center posts 110, 112 and outer circumferential walls 116, 118 of cups 106, 108 as is well known to those skilled in the relevant art. Alternatively, core 28-3 of power transformer 18 can be made of powdered molybdenum having a substantially toroidal configuration as illustrated in FIG. 3. The powdered molybdenum from which core 28-3 is formed has the effect of forming a distributed air gap.

The increased reluctance of core 28 further enhances inverter 10's tolerance to MOSFET caused offsets by speeding up the slower and slowing down the faster off-going MOSFETs drain to source voltage risetimes. This produces correcting volt-seconds which cancel out some of the saturating volt-seconds caused by MOSFET mismatches.

Transformer cores such as are illustrated in FIGS. 2–6 are commercially available from Ferroxcube, a Division of Amperex Electronic Corporation, for example. Other configurations of magnetic cores 28 to obtain the desired levels of reluctance are well known to those skilled in the transformer art.

Other problems solved by gate drive circuit 14 are the result of turning on an on-coming power MOSFET too quickly or of turning on the on-coming power MOSFET too slowly, either of which can produce destructive current spikes. The too fast on problem is solved by choosing a minimum value for resistors 82, 90 in series with 54 and 56 that satisfies the too fast on requirement. If the not fast enough on requirement is not met, this problem can be solved by increasing the reluctance of the core of transformer 18 by increasing the size of the air gap 11 of core 28-2, for example, which results in more inductive current being produced at switching. This current causes intrinsic body diodes 120, or 122 of MOSFETs 38, 34, whichever is the on-coming MOSFET to conduct longer which allows enough time for the on-coming MOSFET to be fully turned on by gate circuit 14 and ready to conduct positive current once the body diode of the on-coming MOSFETs stops conducting.

Primary resistors 54, 56 which are in series with windings 48, 49 of driver transformer 50 force a favorable interaction between mismatched power MOSFETs such as 38, 44 which results in a 1.8 worst case turn-on time ratio compared with a 2.9 worst case turn-on time ratio with prior art gate drive circuits. In addition, resistors 54, 56 prevent transformer 50 and transistors 58, 60 burnout due to a malfunction of oscillator 65, for example.

The following table identifies the values of the resistors of the preferred embodiment.

resistors 54, 56—205 ohms,
resistors 82, 90—390 ohms,
resistors 69, 72—1,000 ohms.

In the preferred embodiment driver transformer 50 should have characteristics that approach those of an ideal transformer, i.e., minimum winding resistance, minimum interwinding leakage inductance, and minimum core losses. In addition, the number of turns of winding 48 equals the number of turns of winding 49, and the number of turns of 76 equals those of 78, one hundred turns each in the preferred embodiment. However, the number of turns of windings 48, 49 may differ from the number of turns of windings 76, 78 as a function of, or to compensate for, the magnitude of the driver circuit voltage applied to terminal 52 and the gate characteristics of MOSFETs 38, 44.

From the foregoing it is believed obvious that this invention provides an improved inverter that prevents both power MOSFETs from being on at the same time, that prevents turning on the on-coming MOSFET too quickly while minimizing the possibility of turning on the on-coming MOSFET too slowly, which prevents saturation of the core of the power transformer and prevents the gate driver transformer and the gate driver transistors of the gate circuit from being destroyed by an excessive current flow.

Obviously, many modifications and variations of the present invention are possible and in light of the above teachings, it is therefore to be understood that within the scope of the appended claims the invention may be practiced otherwise and as specifically described and illustrated.

What is claimed is:
1. An inverter comprising:
a power transformer having a primary winding having a center tap, said primary winding having a pair of output terminals, the center tap of the primary winding being connected to a power transformer input terminal, said transformer having a core having an air gap and a secondary winding;
a pair of power MOSFETs, each of said MOSFETs having a drain, a source, and a gate, the drain of each MOSFET being connected respectively to one of the output terminals of the primary winding, the sources of said MOSFETs being connected to ground;
a gate driver transformer having a pair of primary windings and a secondary winding, said secondary winding having a center tap dividing the secondary winding into two portions each of said windings having a pair of terminals;
a gate driver power input terminal;
a pair of control transistors connected respectively to one terminal of the pair of primary windings of the driver transformer for controlling the flow of D.C. power through each of the primary windings of the driver transformer; each of said transistors having a collector, an emitter and a base;
a pair of current limiting and off-time setting primary resistors connected between the gate driver power input terminal and the other terminal of the primary windings of the gate driver transformer so that a primary resistor is connected in series with each of the primary windings of the gate driver transformer;
a source of timing signals connected to the bases of the driver transistors;
a pair of coupling circuits connecting respectively the terminals of the secondary windings of the gate driver transformer to the gates of the power MOSFETs, each coupling circuit including a secondary resistor and a secondary diode connected in parallel, each secondary diode being poled to oppose the flow of current turning-on a power MOSFET;
the resistances of each of the primary resistors being substantially equal, the resistances of each of the secondary resistors being substantially equal and the relationship between turn-off and turn-on times of the MOSFETs being a function of the relationship of the resistances of a primary resistor to that of a secondary resistor plus that of a primary resistor.

* * * * *